United States Patent [19]

Johnson et al.

[11] Patent Number: 4,627,068
[45] Date of Patent: Dec. 2, 1986

[54] FIBER OPTICS INTERFACE FOR A DYE LASER OSCILLATOR AND METHOD

[75] Inventors: Steve A. Johnson, Tracy; Lynn G. Seppala, Pleasanton, both of Calif.

[73] Assignee: The United States of America as represented by the Department of Energy, Washington, D.C.

[21] Appl. No.: 620,305

[22] Filed: Jun. 13, 1984

[51] Int. Cl.$^4$ .............................................. H01S 3/08
[52] U.S. Cl. ..................... 372/101; 372/70; 372/6; 372/54; 372/56
[58] Field of Search .................. 372/70, 56, 98, 6, 54, 372/101, 99; 350/96.10, 96.18; 356/231 R; 362/32

[56] References Cited

U.S. PATENT DOCUMENTS

| | | | |
|---|---|---|---|
| 3,793,541 | 2/1974 | Ashkin et al. | 372/6 |
| 4,294,511 | 10/1981 | Yamashita et al. | 350/96.18 |
| 4,341,438 | 7/1982 | Seki et al. | 350/96.18 |
| 4,358,851 | 11/1982 | Scifers et al. | 372/6 |
| 4,398,790 | 8/1983 | Righini et al. | 350/96.18 |

Primary Examiner—Leon Scott, Jr.
Attorney, Agent, or Firm—P. Martin Simpson, Jr.; L. E. Carnahan; Judson R. Hightower

[57] ABSTRACT

A dye laser oscillator in which one light beam is used to pump a continuous stream of dye within a cooperating dye chamber for producing a second, different beam is generally disclosed herein along with a specific arrangement including an optical fiber and a fiber optics interface for directing the pumping beam into the dye chamber. The specific fiber optics interface illustrated includes three cooperating lenses which together image one particular dimension of the pumping beam into the dye chamber from the output end of the optical fiber in order to insure that the dye chamber is properly illuminated by the pumping beam.

7 Claims, 5 Drawing Figures

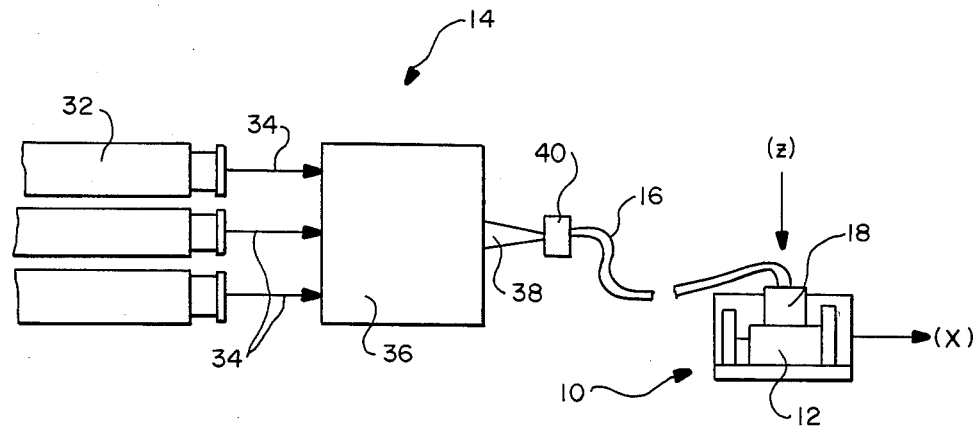
FIG.—1
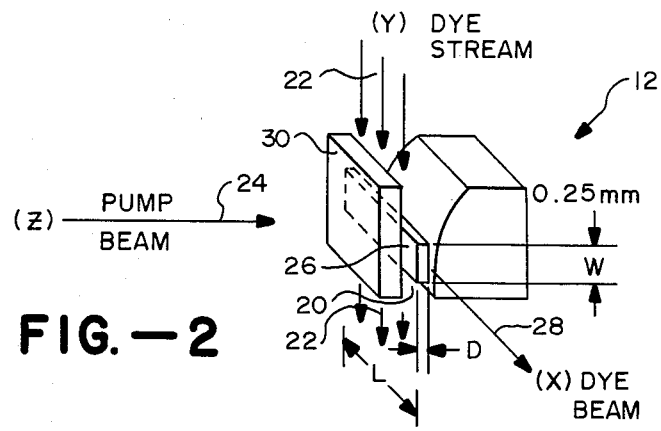
FIG.—2
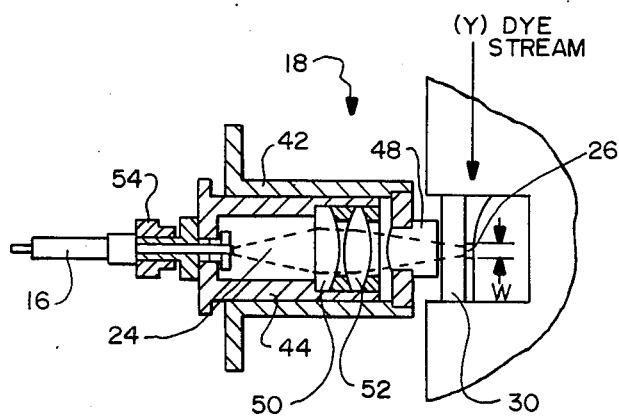
FIG.—3

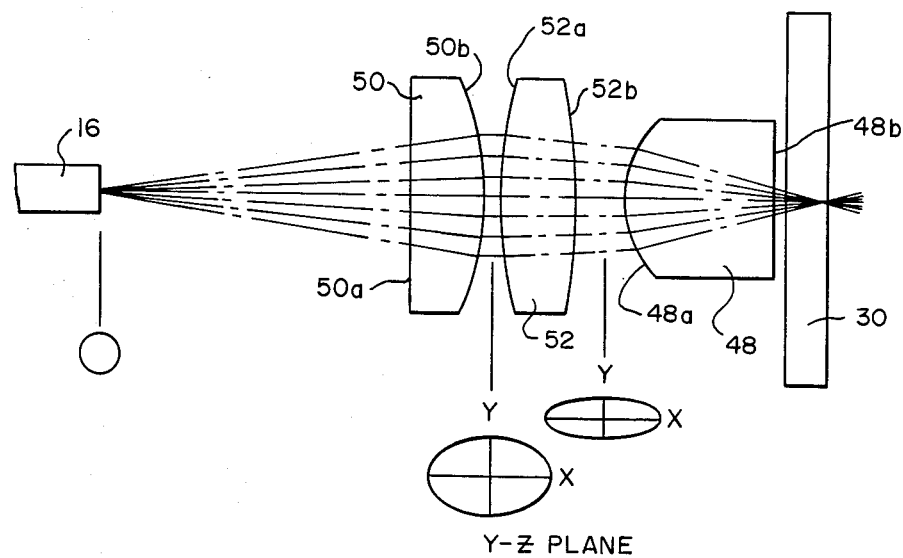
FIG. — 4
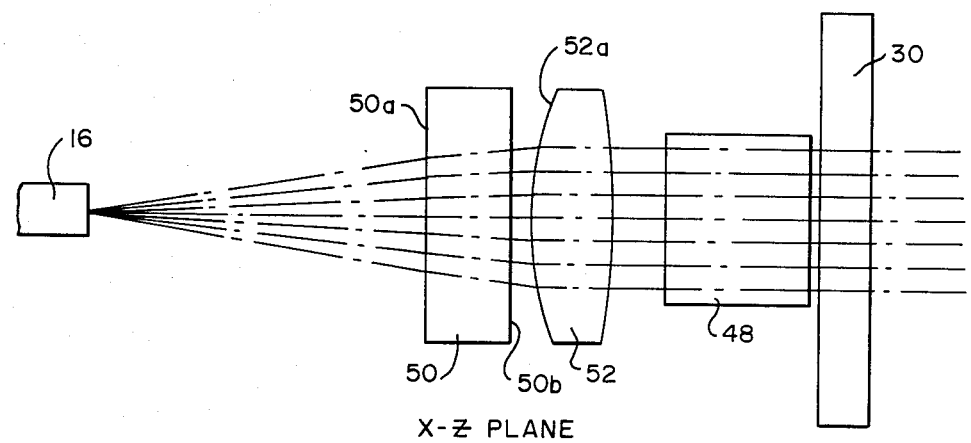
FIG. — 5

FIBER OPTICS INTERFACE FOR A DYE LASER OSCILLATOR AND METHOD

FIELD OF THE INVENTION

The United States Government has rights in this invention pursuant to Contract No. W-7405-ENG-48 between the United States Department of Energy and the University of California for the operation of the Lawrence Livermore National Laboratory.

BACKGROUND OF THE INVENTION

The present invention relates generally to a means for and method of illuminating a given area of known configuration from a source of light which is located at a point spaced from the area to be illuminated, and more particularly to a means for and method of illuminating the lasing zone in the dye chamber of a master dye laser oscillator with light from a pumping beam.

A typical dye laser oscillator includes, among other components, a dye cell, a beam expander, an etalon, a grating assembly, and an output coupler which supports an end mirror. A pump laser beam, for example copper vapor laser beam, is directed into a particular zone within the dye cell which is designed to receive a continuous supply of dye therethrough. This causes the dye to lase in the zone being illuminated by the pump beam and thereby produce a dye beam which is directed through the beam expander, the latter serving to expand the beam in one direction, whereby to produce a ribbon of light. This ribbon passes through the etalon and onto the grating which directs the beam (actually a portion thereof) back through the etalon, the beam expander and into the dye cell where it is amplified before finally impinging on the end mirror of the output coupler. A portion of this beam passes through the end mirror and forms the output dye beam for the overall oscillator. The rest of the beam is reflected back into and through the dye cell where the process is repeated for purposes of amplification. The etalon and grating assembly serve to limit the ultimately produced beam to a particular narrow wavelength band, the grating serving as a coarse tuning mechanism while the etalon serves as a fine tuning mechanism.

In the dye laser oscillator of the general type just described, it is important that all of the components just mentioned be precisely optically aligned relative to one another. One step which is taken to insure that this is the case is to use the intended lasing zone within the dye cell (e.g., the zone which is supposed to be illuminated by the pump laser beam) as a frame of reference for aligning purposes. Thus, it is essential that the entire lasing zone to be illuminated is, in fact, illuminated by the pump laser. At the same time, it is inefficient and quite costly from an economic standpoint to illuminate an area even slightly larger than the intended lasing zone since the cost of producing pump beam photons is relatively higher. Moreover, since the lasing zone itself is quite small, any spillage beyond the zone can be quite significant.

Heretofore, one way of illuminating the lasing zone in the dye cell of a dye laser oscillator with a pumping beam has been by means of optical concentration utilizing a single glass lens. While this approach may or may not be satisfactory if the cross section of the pumping beam is relatively large, the present invention contemplates a relatively small pump beam cross section in combination with a lasing zone which is relatively large in the lengthwise direction and relatively small widthwise. Specifically, the present invention contemplates producing a relatively large number of low power, secondary pump beams which are combined by means of multiplexing to produce a single output beam for pumping the dye passing through the dye cell. However, for such an output beam to be usable, it must be purified, that is, act as a single, homogeneous beam of light without any traces of the prior multiplexing of the lower power secondary beams. As will be seen hereinafter, the ultimately produced output beam is purified by passing it through a sufficiently long optical fiber. At the same time, using an optical fiber as a means of conveying a pumping beam to the dye cell of the dye laser oscillator has other advantages. However, considering the cross section of the optical fiber contemplated which is on the order of 0.6 mm in diameter and the size of the lasing zone contemplated, specifically 8.00 mm long by 0.25 mm wide, it is extremely difficult to accurately and reliably direct all of the light from such a fiber uniformly into such a zone, especially by means of optical concentration.

SUMMARY OF THE INVENTION

In view of the foregoing, it is an object of the present invention to illuminate uniformly the intended lasing zone in the dye cell of a master oscillator such as the one described with all of the light from a pump beam in a relatively uncomplicated and yet reliable manner.

Another object of the present invention is to produce the last-mentioned pumping beam by multiplexing together a number of lesser power secondary beams and to purify this pump beam by passing it through an optical fiber such as the one recited above without adversely affecting the ability to uniformly illuminating the lasing zone without spillage.

A more specific object of the present invention is to provide an uncomplicated and yet reliable optical arrangement interfacing with the optical fiber just mentioned and the dye cell for insuring that substantially all of the light at the output end of the optical fiber just recited is directed substantially uniformly across the lasing zone of the dye cell, without spillage.

Another specific object of the present invention is to provide a particular optical interface arrangement designed to image one dimension of the pump beam into the lasing zone, whereby to more accurately control the way in which the lasing zone is illuminated in the corresponding dimension.

A further object of the present invention is to use the optical interface arrangement just recited for optically illuminating other areas of known configuration (aside from lasing zones in a dye cell).

In brief, one aspect of the present invention is directed to a lasing arrangement in which a continuous stream of dye is caused to flow through a given zone in a cooperating dye chamber while the zone is being illuminated by light from a pumping beam. This, in turn, causes the dye to lase within the zone and thereby produce (or amplify) a dye beam. Such an arrangement can be either a dye laser oscillator which is specifically illustrated herein or it can be a dye amplifier. In either case, means are provided for producing a plurality of secondary beams of lower power than the pump beam along with a light multiplexing assembly including optical fiber means for combining the lower power secondary beams into a single purified output beam which exits the optical fiber means as the pump beam. Light coupling means cooperate with the output end of the optical fiber means for optically directing the pumping beam into the lasing zone of the dye chamber whereby to illuminate the zone, preferably uniformly, utilizing all of the light from the beam.

In an actual working embodiment of the present invention, the optical means just recited includes means for optically imaging one dimension of the pump beam, as the one dimension appears at the output of the fiber means, onto the cross sectional configuration of the zone. In this same actual working embodiment, the cross section of the pump beam, as it appears at the output end of the fiber means, has a diameter of 0.6 mm and the zone has a widthwise dimension of 0.25 mm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

FIG. 1 diagrammatically illustrates a dye cell forming part of an overall dye laser oscillator in combination with a means for producing its pump beam.

FIG. 2 illustrates in cross section the lasing chamber defined by the dye cell of FIG. 1 in combination with a fiber optics interface arrangement designed in accordance with the present invention to direct the pump into the lasing chamber.

FIG. 3 is an enlarged, perspective view of the lasing chamber itself shown in an x,y,z coordinate system.

FIG. 4 diagrammatically illustrates how the optical interface arrangement of FIG. 2 directs the pumping beam into the lasing zone in the y,z plane.

FIG. 5 diagrammatically illustrates how the fiber optics interface directs the pumping beam into the lasing zone in the x-z plane.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to the drawings, wherein like components are designated by like reference numerals throughout the various figures, attention is first directed to FIG. 1 which illustrates a dye laser oscillator generally indicated at 10. The oscillator is shown specifically including a dye cell 12 in combination with an arrangement 14 for producing a pump beam and an arrangement 18 for interfacing the output end of arrangement 14 with the dye cell in the manner to be described. As will be seen, the output end of arrangement 14 is in the form of an optical fiber 16.

As best illustrated in FIG. 2, dye cell 12 includes a dye chamber 20 through which a continuous stream of dye passes, as indicated by the arrows 22. At the same time, chamber 20, actually a relatively small rectangular zone 26 within the chamber, is illuminated by means of a pump beam 24 so as to excite or pump the dye as the latter passes through the zone in order to cause the dye to lase and thereby produce a dye laser beam 28. For purposes of description, the intended lasing chamber 26 has been placed in an x,y,z coordinate system in the manner shown in FIG. 2 with its center at the origin of the coordinate system. The dye stream is shown moving downward along the y-axis while the pump beam 24 passes into the chamber through a glass window 30 along the z-axis thereby producing a dye beam 28 along the x-axis. In an actual working embodiment of dye laser oscillator 10, the illumination or lasing zone 26 in dye cell 12 is of a pre-established configuration to which the other components making up the oscillator are optically aligned. This is especially true with regard to the width W of the zone which extends along the y-axis. As illustrated in FIG. 2, the overall zone is elongated in the x direction, as indicated by the length L which is substantially greater than its width W. At the same time, it displays a depth D in the z direction which is limited by the depth of chamber 20. In an actual working embodiment, the width W of zone 26 is about 0.25 mm,its length L is about 8.00 mm and its depth D is about 0.25 mm. It is a primary goal of the present invention to illuminate this entire lasing zone uniformly across its length and especially across its width utilizing substantially all if not entirely all of the light from pump beam 24. As will be seen hereinafter, this is made possible by means of fiber interface arrangement 18 (FIG. 1) even though an optical fiber, specifically fiber 16 (FIG. 1), is used ultimately to provide the pump beam from overall arrangement 14 and even though the output end of this optical fiber is only 0.6 mm in diameter.

Returning to FIG. 1, overall arrangement 14 for producing pump beam 24 (FIG. 2) is shown including a plurality of copper vapor lasers generally indicated at 32, each of which produces a secondary beam 34 of lower power than beam 24. Pump beam 24 is ultimately produced from the lower power beams 34 by means of a multiplexing network 36 which combines beams 34 in the appropriate manner so as to provide a single intermediate light cone 38 of beams which is directed into the input end of optical fiber 16 by means of a cooperating fiber optics interface 40. Because intermediate light cone 38 is the direct result of multiplexing together a plurality of individual beams, that is, lower power beams 34, these lower power beams, do not individually contain the proper power levels or operate at the correct frequency. Multiplexing allows the operating frequency to be multiplied. Optical multiplexing is only useful when the emergent wavefront from the final multiplexed beam is homogeneous and contains equal contributions from the input beams. As a result, it is not desirable to use beam 38 itself as the pumping beam for oscillator 10 unless it can be made optically homogeneous. Optical fiber 16 serves this purpose since, as stated previously, the optical fiber functions in a known manner to mix the light passing through it suffi- cient to provide an optically homogeneous beam, specifically beam 24, at its output end.

The present invention is directed to the technique just recited for purifying light cone 38 to provide an optically homogeneous beam by means of an optical fiber in combination with the specific way in which the optically homogeneous beam is made to illuminate lasing zone 26. The present invention is not concerned with the multiplexing network 36 per se or fiber optics interface 40 per se and, hence, neither will be described herein. It suffices to say that a series of optical lenses, mirrors and polarizers are combined to produce an intermediate beam (corresponding to light cone 38) and focus this light cone into optical fiber interface 40 which insures that the multiple beams (making up the light cone) impinge on the input face of optical fiber 16. The light collected by optical fiber 16 at its input is then mixed, as stated previously, to provide optically pure pump beam 24 at the opposite, output end of the optical fiber.

Referring to FIG. 3 in conjunction with FIGS. 4 and 5, attention is directed to fiber optics interface 18 which is designed in accordance with the present invention for directing all of the light in beam 24 from the output end of fiber 16 into lasing zone 26 through window 30. As illustrated particularly in FIG. 3, interface 18 includes an elongated outer lens housing 42 suitably mounted for rotational and translational movement around a telescopically movable inner lens housing 44. The forwardmost end of outer housing 42 carries a downstream lens 48 in alignment with its own central axis while the inner housing 44 carries an upstreammost lens 50 and an intermediate lens 52 in coaxial alignment with lens 48. As a result, lens 48 is rotatable and translatable relative to lenses 50 and 52 which are fixed relative to one another. At the same time, the back end of inner housing 44 is closed, except for a central through-hole in alignment with the axis of the outer housing. A means generally indicated at 54 is provided for coupling the outer end of fiber 16 into the central opening just mentioned so that pump beam 24 emerges from the optical fiber along the axis of outer housing 42 in the direction of lens 50.

With lasing chamber 26 oriented in the x,y,z coordinate system as illustrated in FIG. 2, the outer housing 42 is positioned in coaxial relationship with the z-axis such that lens 48 is located in close proximity to but preferably not against the outer surface of window 30. As will be seen below, the combination of lenses 48, 50 and 52 serves to optically image one dimension of beam 24 from the output end of fiber 16 into zone 26 while the perpendicular dimension is allowed to expand and be collimated to a predetermined size. Specifically, with the positional relationship between lasing chamber 26 and fiber optics interface 18 illustrated in FIG. 3, the three lenses combine to image the beam in the y,z plane such that the beam in this plane (at the lasing chamber 26) is the optical image of the beam in the same plane at the output of fiber 16. As a result, optical interface 18 is able to more accurately control this dimension of the beam across the width of the lasing chamber than would be possible merely by means of optical concentration. Thus it is possible to reliably focus down to precisely the width W of the lasing chamber, for example 0.25 mm. At the same time, the lens combination acts on the beam in the x-z plane in order to allow the beam first to expand to the length L corresponding to lasing zone 26, for example 8.00 mm, and then the lens combination collimates the beam in this plane so as to limit its length to L as it passes through the lasing zone.

Since the length of lasing zone 26 is substantially longer than it is wide and since the width is critical to the alignment of the other components making up the dye laser oscillator 10, it is more important to accurately control the beam's width (its y,z plane) by means of imaging than to control its length (its x,z plane) by the same means. To control both its width and its length by means of imaging would be too complicated to be practical and would serve no significant benefit. The depth of field of the beam at zone 26, e.g. its depth D, is determined by the degree of magnification (or demagnification) required. If, for example, a large degree of demagnification is required, the depth of field is relatively short whereas, if the degree of demagnification required is small, the depth of field is larger. In the case of the present invention, the depth of the dye cell, e.g. the lasing zone, is so small (thin) it is not significant. For purposes herein, the combination of lenses 48, 50 and 52 are designed to image the width of beam 24 into a central plane within the thickness (depth) of dye chamber 20.

The way in which lenses 48, 50 and 52 function to image beam 24 into lasing zone 26 in the y,z plane is best illustrated in FIG. 4. As seen in this figure which shows the lens in the y,z plane, downstreammost lens 50 is flat on its upstream side 50a and cylindrical on its downstream side 50b; intermediate lens 52 is spherical on both its upstream and downstream sides 52a, 52b, respectively; and downstreammost lens 48 is cylindrical on its upstream side 48a and flat on its downstream side 48b. As a result, as the expanding beam 24 passes through lens 50a, it is compressed or flattened in the y direction, as illustrated, and further flattened by lens 52. Lens 48 then further flattens the beam in the same direction so as to ultimately image the beam into a plane which is a predetermined distance downstream from and parallel with the downstream side 48b of lens 48. The spatial relationship between the imaging plane and lens 48 is caused to vary slightly due to the refraction characteristics of window 30 and, hence, these characteristics have to be taken into account in order to place the imaging plane in coextensive relationship with the desired plane through lasing zone 26, as shown in FIG. 4.

Referring to FIG. 5, attention is directed to the way in which lenses 48, 50 and 52 cooperate to collimate beam 26 after first allowing it to expand in the x-z plane. As seen in this latter figure, both the upstream and downstream sides 50a and 50b of lens 50 are flat and this is also the case for the corresponding sides of lens 48. At the same time, both sides of lens 52 are spherical. In this way, in the x-z plane, beam 24 is allowed to expand through lens 50 and is then collimated as it passes through lens 52. As a result, the distance between the output of fiber 16 and the second lens 52 determines the amount of expansion of the beam and hence the length L of the beam in lasing zone 26. By slidably moving inner lens housing 44 relative to its outer housing, slight adjustments can be made to the imaging plane in the y,z plane and the amount of expansion of the beam in the x,z plane. At the same time, outer housing 42 can be rotated in order to rotate lens 48 about the z-axis. This, in turn, allows the imaging plane to be rotated, if necessary in order to properly align it with lasing zone 26. In this regard, arrangement 18 could be made to rotate as a unit about the z-axis and/or translate along the y-axis to ensure proper alignment between the imaging plane and the lasing zone.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. In a lasing arrangement including a dye chamber defining a given zone having a cross sectional configuration which displays fixed lengthwise and widthwise dimensions and through which a continuous stream of dye flows in one direction while said zone is being illuminated by light from a first pumping beam which is directed into the zone along a second direction and which causes said dye to lase within said zone, said arrangement also including means to produce or amplify a dye beam extending in a third direction, the improvement comprising:
   (a) means for producing a plurality of pump beams of lower power and different frequencies than said first pumping beam;
   (b) a light multiplexing assembly including optical fiber means having an output end for combining said lower power beams into a single beam which exits the optical fiber means at its output end and which serves as said first pumping beam; and
   (c) light coupling means connected with with the output end of said optical fiber means for optically directing said first pumping beam into said dye chamber zone to illuminate said zone with light from said first pumping beam, said light coupling means including optical means for causing substantially all of the light from said first pumping beam to be directed substantially uniformly into said cross sectional configuration, said optical means including means for optically imaging one dimension of said first pumping beam, as said one dimension appears at the output end of said optical fiber means, into the widthwise dimension of said zone.

2. The improvement according to claim 1 wherein the cross section of said first pumping beam, as it appears at the output end of said optical fiber means, has a diameter of about 0.6 mm and wherein the widthwise dimension of said zone is 0.25 mm.

3. The improvement according to claim 2 wherein the lengthwise dimension of said zone is about 8.00 mm.

4. The improvement according to claim 1 wherein said optical imaging means includes a first cylindrical lens means, a spherical lens means, and a second cylindrical lens means separate from one another and successively located downstream of the output end of said optical fiber means between said optical fiber and said zone.

5. The improvement according to claim 1 wherein said optical fiber means includes a single optical fiber which sufficiently mixes the light from all of said lower power beams so that the lower power beams are not detectable from the combined first pumping beam.

6. In a lasing arrangement including a dye chamber defining a given zone having a cross sectional configuration which displays fixed lengthwise and widthwise dimensions and through which a continuous stream of dye flows in one direction while said zone is being illuminated by light from a first pumping beam which is directed into the zone along a second direction and which causes said dye to lase within said zone, said arrangement also including means cooperating with the lasing dye to produce and amplify a dye beam extending in a third direction, the improvement comprising:
   (a) means for producing a plurality of pump beams of lower power and different frequencies than said first pumping beam;
   (b) a light multiplexing assembly including a single optical fiber having an output end for combining said lower power beam into a single beam which exits the optical fiber means at its output end and which serves as said first pumping beam, all of the light of said lower power beams is sufficiently mixed within said single optical fiber so that the lower power beams are not detectable from the combined first pumping beam; and
   (c) light coupling means connected with the output end of said optical fiber means for optically directing said first pumping beam into said dye chamber zone to illuminate said zone with light from said first pumping beam, said coupling means including optical means for causing substantially all of the light from said first pumping beam to be directed substantially uniformly into said cross sectional configuration, said optical means including means for optically imaging one dimension of said first pumping beam, as said one dimension appears at the output end of said optical fiber means, into the widthwise dimension of said zone, said optical imaging means including a first cylindrical lens means, a spherical lens means, and a second cylindrical lens means separate from one another and successively located downstream of the output end of said single optical fiber between said optical fiber and said zone.

7. In a method of producing and amplifying a dye beam including the steps of causing a continuous stream of dye to flow in one direction through a dye chamber defining a given zone having a cross sectional configuration which displays fixed lengthwise and widthwise dimensions while said zone is being illuminated by light from a first pumping beam which is directed into the zone along a second direction and which is provided to cause said dye to lase within said zone, said method also including the step of producing and amplifying a second, dye beam extending in a third direction, the improvement comprising the steps of:
   (a) producing a plurality of pump beams of lower power and different frequencies than said first pumping beam;
   (b) combining said lower power beams by means of multiplexing so as to form a single beam and purifying said single beam by passing it through an optical fiber such that the beam which exits the optical fiber means serves as said first pumping beam; and
   (c) optically directing said first pumping beam into said dye chamber zone to illuminate said zone with light from said first pumping beam, said optical directing step including causing substantially all of the light from said first pumping beam to be directed substantially uniformly into said cross sectional configuration by optically imaging one dimension of said first pumping beam, as said one dimension appears at the output end of said optical fiber means, into the widthwise dimension of said zone.

* * * * *